(12) United States Patent
Kim et al.

(10) Patent No.: US 8,501,355 B2
(45) Date of Patent: Aug. 6, 2013

(54) ELECTROLYTE, AND SECONDARY BATTERY COMPRISING SAME

(75) Inventors: Yo Jin Kim, Daejeon (KR); Han Ho Lee, Daejeon (KR); Seung Don Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/138,503

(22) PCT Filed: Mar. 2, 2010

(86) PCT No.: PCT/KR2010/001289
§ 371 (c)(1),
(2), (4) Date: Oct. 12, 2011

(87) PCT Pub. No.: WO2010/098645
PCT Pub. Date: Sep. 2, 2010

(65) Prior Publication Data
US 2012/0028133 A1    Feb. 2, 2012

(30) Foreign Application Priority Data

Feb. 27, 2009 (KR) .................. 10-2009-0016798
Mar. 2, 2010 (KR) .................. 10-2010-0018477

(51) Int. Cl.
*H01M 10/56* (2006.01)
*C07C 265/12* (2006.01)

(52) U.S. Cl.
USPC ........... 429/339; 429/340; 429/341; 429/343; 560/358

(58) Field of Classification Search
USPC .................................. 429/339–343; 560/358
See application file for complete search history.

(56) References Cited

U.S. PATENT DOCUMENTS
2011/0091768 A1 *    4/2011    Ohashi et al. ................. 429/199

FOREIGN PATENT DOCUMENTS
KR    10-2010-0057612 A        5/2010
KR    1020100057612 A    *    5/2010

* cited by examiner

*Primary Examiner* — Karie O'Neill Apicella
(74) *Attorney, Agent, or Firm* — Birch, Stewart, Kolasch & Birch, LLP

(57) ABSTRACT

Provided are an electrolyte which may prevent the degradation of the battery performance by including a functional group which can react with a side reaction site which is responsible for decomposition of negative electrode material components and a functional group which can react with moisture which is responsible for decomposition of positive electrode material components in an electrolyte of the battery to ensure the stability of the battery at high temperatures, and a secondary battery manufactured by adding the same. The present invention may employ a compound including a functional group which can react with a side reaction site of a negative electrode material and a functional group which can react with moisture to maximize the improvement of the storage performance of a secondary battery at high temperatures.

7 Claims, No Drawings

ELECTROLYTE, AND SECONDARY BATTERY COMPRISING SAME

CROSS-REFERENCE TO RELATED APPLICATIONS

This application claims priority the benefit of Korean Patent Application Nos. 10-2009-0016798, filed on Feb. 27, 2009, and 10-2010-0018477, filed on Mar. 2, 2010, which are hereby incorporated by reference in its entirety into this application.

BACKGROUND OF THE INVENTION

The present invention disclosed herein relates to an electrolyte including a compound having a functional group which can react with a side reaction site of a negative electrode material in a secondary battery and a functional group which can react with moisture, and to a secondary battery with improved storage performance at high temperatures by including the electrolyte to prevent the degradation of the performance of the battery.

A lithium secondary battery, widely used as a power source of a laptop computer, a camcorder, a mobile phone, etc., consists of a cathode including a lithium metal complex oxide which is capable of intercalating and disintercalating lithium ions or sulfur, an anode containing a carbon material or a metal lithium, etc., and an electrolyte in which an appropriate amount of a lithium salt is dissolved in a mixed organic solvent.

Lithium ions released from the cathode active material such as lithium metal oxide during an initial charging process of a lithium secondary battery move towards the anode active material such as graphite and then are intercalated between the layers of the anode active material. At this time, due to the high reactivity of lithium, the electrolyte reacts with carbon of the anode active material on the surface of the anode active material such as graphite, thereby generating compounds such as $Li_2CO_3$, $Li_2O$ and $LiOH$. These compounds form a kind of Solid Electrolyte Interface (SEI) film on the surface of the anode active material such as graphite.

The SEI film serves as an ion tunnel, which allows only lithium ions to pass. Due to the ion tunnel effects, the SEI film prevents an organic solvent having a high molecular weight, which moves together with lithium ions in the electrolyte from being intercalated into layers of the anode active material and thus breaking down the anode structure. Thus, since the electrolyte is not contacted with the anode active material, the electrolyte is not decomposed, and also the amount of lithium ions in the electrolyte is reversibly maintained, thereby ensuring stable charging/discharging.

However, if a battery is left at a high temperature in a fully charged state, the SEI film is slowly broken down due to increased electrochemical energy and thermal energy over time. As a result, side reactions continuously occur between the exposed surface of the anode and surrounding electrolyte. Due to continuous gas generation at this time, an internal pressure of the battery is increased, thereby increasing thicknesses of a prismatic battery and a pouch battery, and this may cause problems in electronics such as mobile phones and laptop computers. That is, the battery has poor stability at high temperatures.

Therefore, various studies to enhance the stability of a battery at high temperatures have been conducted. In order to inhibit the internal pressure of a battery from increasing, studies on a method of adding an additive to the electrolyte so as to change the phase of the SEI film forming reaction are representative among them. For example, Japanese Patent Application Laid-Open Publication No. H07-176323 discloses an electrolyte to which CO2 is added. Japanese Patent Application Laid-Open Publication No. H07-320779 discloses a technology that a sulfide-based compound is added to an electrolyte to inhibit the decomposition of the electrolyte. Japanese Patent Application Laid-Open Publication No. H09-73918 discloses a technology that diphenyl picrylhydrazyl (DPPH) is added to enhance the stability of a battery at high temperatures. Japanese Patent Application Laid-Open Publication No. H08-321313 discloses a technology that a certain compound is added to enhance the charge/discharge cycle life of a battery.

SUMMARY OF THE INVENTION

The present invention is provided in order to solve the related art problems that the stability of a battery at high temperatures is degraded due to side reactions of the electrode active material with electrolyte components.

Thus, the present invention may improve the storage performance of a battery at high temperatures and the cycle performance of a battery because a compound including both a functional group which can react with a side reaction site which is responsible for decomposition of negative electrode material components and a functional group which can react with moisture which is responsible for decomposition of positive electrode material components may be included as a component of an electrolyte to prevent the negative and positive electrodes from being decomposed in advance due to side reactions of the electrode active material with the electrolyte.

It is an object of the present invention to provide an electrolyte having excellent storage performance of a battery at high temperatures, which may prevent the degradation of the battery performance.

It is another object of the present invention to provide a secondary battery with improved storage performance at high temperatures and cycle performance by adding the electrolyte to the battery.

DETAILED DESCRIPTION OF PREFERRED EMBODIMENTS

An electrolyte according to the present invention includes a compound represented by the following Formula 1:

B—R-A                    Formula 1

In Formula 1, B is one or more selected from $NO_2$, $NH_2$, SiOH or $(RCO)_2O$ (wherein R is a $C_1$ to $C_{10}$ alkylene group, a $C_1$ to $C_{10}$ haloalkylene group, and a $C_6$ to $C_{12}$ arylene group.);

R represents a hydrogen atom, a halogen atom, R, OR, SR, COR, OCOR, NRR', and CONRR' wherein R and R' are each a $C_1$ to $C_{10}$ alkylene group, a $C_1$ to $C_{10}$ haloalkylene group, and a $C_6$ to $C_{12}$ arylene group, and may form a ring together; and A is selected from NCO or CN.

In addition, a secondary battery of the present invention is manufactured by adding a compound represented by Formula 1 to an electrolyte:

Hereinafter, the present invention will be described in more detail as follows.

The present invention relates to a secondary battery which may enhance the stability of the battery at high temperatures by adding a compound which includes a functional group which can react with a side reaction site of a negative electrode material in a secondary battery and a functional group which can react with moisture to an electrolyte to prevent the decomposition of the electrode.

The electrolyte of the present invention includes a compound represented by the following Formula 1, a solvent, and a typical electrolyte salt.

B—R—A  Formula 1

In Formula 1, B is one or more selected from $NO_2$, $NH_2$, SiOH, or $(RCO)_2O$ (wherein R is a $C_{1-10}$ alkylene group, a $C_{1-10}$ haloalkylene group, and a $C_{6-12}$ arylene group.); R represents a hydrogen atom, a halogen atom, R, OR, SR, COR, OCOR, NRR', and CONRR', wherein R and R' are each a $C_{1-10}$ alkylene group, a $C_{1-10}$ haloalkylene group, and a $C_{6-12}$ arylene group, and may form a ring together; and A is selected from NCO or CN.

The functional group B in Formula 1 is a functional group which can react with moisture to prevent the decomposition of a positive electrode material. Typically, positive electrode material components are known to decompose due to moisture which is introduced from the outside or residing in the internal components. Accordingly, the present invention enhances the storage performance of a battery at high temperatures and the cycle performance by adding a functional group which can react with moisture to a compound represented by Formula 1 to prevent the decomposition of the positive electrode material.

In Formula 1, B is one or more selected from $NO_2$, $NH_2$, SiOH, or $(RCO)_2O$ (wherein R is a $C_{1-10}$ alkylene group, a $C_{1-10}$ haloalkylene group, and a $C_{6-12}$ arylene group.), and $NO_2$ is the most preferable among them.

In Formula 1, R represents a hydrogen atom, a halogen atom, R, OR, SR, COR, OCOR, NRR', and CONRR', wherein R and R' are each a $C_{1-10}$ alkylene group, a $C_{1-10}$ haloalkylene group, and a $C_{6-12}$ arylene group and may form a ring together, and the arylene group among them is the most advantageous in terms of effects of the present invention.

In Formula 1, A is a functional group which can react with a side reaction site of a positive electrode material and is selected from NCO or CN, and NCO is more preferable because NCO may allow a polymer produced by polymerization reaction to be electrically reduced and contribute to the formation of an SEI film layer.

A representative side reaction site of a negative electrode material in a general negative electrode is a catalytic site of an acid such as —COOH, and reacts with a solute such as Li salt, etc. and a solvent to consume Li ions or is responsible for the degradation of a battery performance. Accordingly, the functional group A according to the present invention reacts with —COOH, etc., which is the side reaction site to be converted into an inert site which does not consume lithium ions. Accordingly, the degradation of the battery performance may be prevented because lithium ions of a negative electrode material are not consumed.

The compound represented by Formula 1 is included in an electrolyte and reacts with a side reaction site of a negative electrode material in a battery to prevent the decomposition of negative electrode material components due to a side reaction of the site. Simultaneously, the compound serves to prevent the decomposition of the positive electrode material components by including a functional group which can react with moisture which is known to react with a positive electrode material of the battery.

The compound represented by Formula 1 is included in an amount of 0.1 to 2% by weight based on the total weight of the electrolyte. When it is included in an amount of less than 0.1% by weight, effects of the present invention are not exhibited to a sufficient degree. When it is included in an amount of more than 2% by weight, it is not preferable because the output of the battery may be greatly reduced.

The electrolyte of the present invention may employ a cyclic carbonate and/or a linear carbonate as a solvent. Examples of the cyclic carbonate include ethylene carbonate (EC), propylene carbonate (PC), gamma butyrolactone (GBL), etc. Examples of the linear carbonate include one or more selected from the group consisting of diethyl carbonate (DEC), dimethyl carbonate (DMC), ethylmethyl carbonate, and methylpropyl carbonate.

The electrolyte of the present invention includes an electrolyte salt as a solute with the carbonate compound. The electrolyte salt refers to any salt, for example, an inorganic salt appropriate for ion transfer. The inorganic salt may include one of the following various negative ions. Examples thereof may include $LiClO_4$, LiI, LiSCN, $LiBF_4$, $LiAsF_6$, $LiCF_3SO_3$, $LiPF_6$, NaI, NaSCN, KI, CsSCN, etc.

The present invention also provides a secondary battery manufactured by adding an electrolyte including a compound represented by Formula 1.

The secondary battery of the present invention includes a negative electrode, a positive electrode, and a separator, and the specific structure of the secondary battery is not particularly limited.

The compound represented by Formula 1 according to the present invention includes both a functional group which can react with a side reaction site of a negative electrode material and a functional group which can react with moisture which may cause the decomposition of a positive electrode material. Accordingly, the negative electrode according to the present invention shows particularly excellent effects when one or more carbon-based negative electrode materials selected from the group consisting of crystalline and amorphous carbon-based negative electrode materials are used. In addition, graphite among them may be used as a negative electrode material because it exhibits the best effects.

In addition, all positive electrode materials used for manufacture of a lithium secondary battery may be used in the positive electrode material. However, it is particularly preferable to include a compound which is capable of intercalating and disintercalating lithium ions as a positive electrode material. For example, a metal oxide or a metal sulfide, a polymer (for example, $TiS_2$, $MoS_2$, $NbSe_2$, or $V_2O_5$) or $LiCoO_2$, $LiNiO_2$, and $LiMn_2O_4$ having high energy density and voltage, and $LiFePO_4$ having a peridot (olivine) structure may be used.

In addition, a separator of the present invention is not particularly limited as long as it is a separator using a typical olivine-based polymer and a separator known in the art.

A lithium secondary battery of the present invention may be manufactured by using a method known in the art, and is not particularly limited. For example, the battery may be manufactured by placing a separator between the positive electrode and the negative electrode and introducing an electrolyte. The separator, electrolyte, and other additives if necessary may be used as long as they are known in the art.

Hereinafter, preferable examples are provided for better understanding of the present invention. However, the following examples are provided only for illustrations and thus the present invention is not limited to or by them. In addition, although the present invention is described with reference to examples in the following examples, it is obvious to those skilled in the art that the same effects are exhibited even when equivalents thereof may be used.

Example 1

A mixture in which a mixed solvent with a ratio of EC:DMC:EMP=3:4:3, 1 M of $LiPF_6$ as a solute, and 0.5% by weight of nitrophenyl isocyanate were mixed was used. Natural graphite, a manganese spinel, and a PE/PP/PE separator were used as a negative electrode, a positive electrode active material, and a separator of a battery, respectively. A unit cell battery consisted of the electrolyte, negative electrode, positive electrode, and separator.

Comparative Example 1

A unit cell battery was manufactured in the same manner as in Example 1, except that ethyl isocyanate was used instead of nitrophenyl isocyanate in the solute of the electrolyte.

Comparative Example 2

A unit cell battery was manufactured in the same manner as in Example 1, except that benzyl isocyanate was used instead of nitrophenyl isocyanate in the solute of the electrolyte.

Comparative Example 3

A unit cell battery was manufactured in the same manner as in Example 1, except that vinyl carbonate was used instead of nitrophenyl isocyanate in the solute of the electrolyte.

Comparative Example 4

A unit cell battery was manufactured in the same manner as in Example 1, except that cyclohexyl isocyanate was used instead of nitrophenyl isocyanate in the solute of the electrolyte.

The high temperature storages of the unit cell batteries in Example and Comparative Examples were evaluated by using the following method.

Evaluation of Storage Performance at High Temperatures

The output of a battery was measured immediately after manufacture of the battery, the battery was stored at 60° C. for 4 weeks, the output of the battery was measured, and the two values were compared. The output of the battery was measured according to the USABC FreedomCar manual, and the results are shown in Table 1.

TABLE 1

|  | Output reduction (%) |
|---|---|
| Example 1 | 8 |
| Comparative Example 1 | 22 |
| Comparative Example 2 | 25 |
| Comparative Example 3 | 31 |
| Comparative Example 4 | 30 |

From Table 1, it can be confirmed that the output reduction of a battery was significantly reduced when a compound including a functional group which can react with a side reaction site of a negative electrode material and a functional group which can react with moisture was added to an electrolyte.

However, it can be confirmed that the effects were reduced when compared with Comparative Examples in which only a functional group which can react with a side reaction site of a negative electrode material was included.

The present invention employs a compound including two functional groups, that is, a functional group which can react with a side reaction site of a negative electrode material and a functional group which can react with moisture to prevent the degradation of negative electrode material components due to side reactions with the side reaction site, and simultaneously includes a reaction functional group which can react with moisture which is known to react with the positive electrode material of the battery to prevent the degradation of positive electrode material components. Therefore, the electrolyte of the present invention serves to prevent the decomposition of negative and positive electrode material components of a battery.

The present invention exhibits excellent effects in a lithium secondary battery employing graphite as a negative electrode material.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electrolyte, comprising:
a compound represented by the following Formula 1

$B—R_0-A$                                    Formula 1 wherein B is one or more selected from —$NO_2$, —$NH_2$, —SiOH or ($R_1$CO)O(CO$R_2$) wherein $R_1$ is a $C_1$ to $C_{10}$ alkyl group, $R_2$ is a $C_1$ to $C_{10}$ alkylene group, a $C_1$ to $C_{10}$ haloalkylene group, or a $C_6$ to $C_{12}$ arylene group;

$R_0$ represents R, OR, SR, COR, OCOR, NRR', and CONRR' wherein R is a $C_1$ to $C_{10}$ alkylene group, a $C_1$ to $C_{10}$ haloalkylene group, or a $C_6$ to $C_{12}$ arylene group, R' is a hydrogen atom, a halogen atom or a $C_1$ to $C_{10}$ alkyl group, and R and R' may form a ring together; and A is selected from NCO or CN, wherein the electrolyte reacts to an acid catalyst site of a carbon-based negative electrode material including —COOH, and the decreasing rate of a battery output measured after 4 weeks at 60° C. is less than 10% under the USABC FreedomCar regulation.

2. The electrolyte of claim 1, wherein the compound represented by Formula I is comprised in an amount of 0.1 to 2% by weight based on the total weight of the electrolyte.

3. A secondary battery comprising
a positive electrode material;
a carbon-based negative electrode material; and
an electrolyte, wherein the electrolyte comprises a compound represented by the following Formula 1:

$B—R_0-A$                                    Formula 1 wherein B is one or more selected from —$NO_2$, —$NH_2$, —SiOH or ($R_1$CO)O(CO$R_2$) (wherein wherein $R_1$ is a $C_1$ to $C_{10}$ alkyl group, $R_2$ is a $C_1$ to $C_{10}$ alkylene group, a $C_1$ to $C_{10}$ haloalkylene group, or a $C_6$ to $C_{12}$ arylene group;

$R_0$ represents R, OR, SR, COR, OCOR, NRR', and CONRR' wherein R is a $C_1$ to $C_{10}$ alkylene group, a $C_1$ to $C_{10}$ haloalkylene group, or a $C_6$ to $C_{12}$ arylene group, R' is a hydrogen atom, a halogen atom or a $C_1$ to $C_{10}$ alkyl group, and R and R' may form a ring together; and A is selected from NCO or CN, wherein the carbon-based negative electrode material has an acid catalyst site including —COOH, and wherein the decreasing rate of a battery output measured after 4 weeks at 60° C. is less than 10% under the USABC FreedomCar regulation.

4. The secondary battery of claim 3, wherein the carbon-based negative electrode material is crystalline or amorphous carbon-based negative electrode materials.

5. The secondary battery of claim 4, wherein the carbon-based negative electrode material is graphite.

6. The secondary battery of claim 3, wherein the positive electrode material of the secondary battery comprises a compound which is capable of intercalating and disintercalating lithium ions.

7. The secondary battery of claim 3, wherein the secondary battery is a lithium secondary battery.

* * * * *